United States Patent [19]

Anderson

[11] Patent Number: 5,064,161
[45] Date of Patent: Nov. 12, 1991

[54] UNIVERSAL CEILING MOUNT ASSEMBLY FOR TELEVISION MONITOR

[76] Inventor: Timothy W. Anderson, 720 W. Oak St., Fort Collins, Colo. 80521

[21] Appl. No.: 639,907

[22] Filed: Jan. 10, 1991

[51] Int. Cl.⁵ .............................................. A47H 1/10
[52] U.S. Cl. ..................................... 248/317; 248/917
[58] Field of Search ............... 248/317, 339, 342, 343, 248/671, 489, 121, 231, 220.2, 917; 352/243; 358/229; 211/113

[56] References Cited

U.S. PATENT DOCUMENTS 4,160,999 7/1979 Claggett ........................ 352/243 X
4,993,676 2/1991 Fitts et al. ........................... 248/317

Primary Examiner—Ramon O. Ramirez
Attorney, Agent, or Firm—William E. Hein

[57] ABSTRACT

A ceiling mount assembly facilitates easy installation of commonly available TV monitors without the need for drilling holes or otherwise modifying the monitor. The monitor is retained in a position such that its screen is horizontal for viewing from below by medical and dental patients and other persons in a supine position. The ceiling mount assembly includes a pair of support members that are mounted to adjacent ceiling joists, a fixed U-shaped frame member dependent from the pair of support members in which two corners of a TV monitor are cradled, and a dependent U-shaped bail member hingedly attached to the pair of support members and adapted to be retained within a slot in the front surface of most commercially available 13" TV monitors. A pair of J-hook rods are connected between the fixed U-shaped frame member and the U-shaped bail member to improve the rigidity of the assembly.

3 Claims, 2 Drawing Sheets

UNIVERSAL CEILING MOUNT ASSEMBLY FOR TELEVISION MONITOR

BACKGROUND AND SUMMARY OF THE INVENTION

This invention relates generally to mounting brackets for TV monitors and more particularly to a universal assembly for mounting commonly available 13" TV monitors from a ceiling. A number of different mounting methods are known for mounting a TV monitor for viewing by hospital patients while lying in bed. These known mounting methods typically involve wall or ceiling mounted movable arms or gimbal arrangements for supporting the TV monitor in a position such that the screen is generally vertical. However, TV monitors supported in that way are difficult, if not impossible, to view from a completely supine position. It is advantageous to permit dental patients, obstetrics/gynecology patients, podiatric patients, and patients in traction, for example, to view a TV monitor for entertainment or other purposes from the completely supine position in which these patients typically find themselves. However, in order for persons in a supine position to easily view a TV monitor, it is best positioned above them such that the screen is horizontal. Some ceiling mounting brackets for TV monitors are known in the prior art. However, they are disadvantageous in that they variously require that mounting holes be drilled in the enclosure of the TV monitor; they do not hold the TV monitor in the desired position, and they do not permit easy installation and removal of the TV monitor.

Accordingly, it is a principal object of the present invention to provide a ceiling mount for commonly available TV monitors that does not require any modification of the monitor, that retains the monitor in a position such that its screen is horizontal, and that also permits quick and easy installation and removal of the monitor without requiring that mounting holes be drilled in the monitor or that it be modified in any other way.

These and other incidental objects are accomplished in accordance with the illustrated preferred embodiments of the present invention by providing a ceiling mount assembly that includes a pair of support members that are mounted to adjacent ceiling joists, a fixed U-shaped frame member dependent from the pair of support members in which two corners of a TV monitor are cradled, and a dependent U-shaped bail member hingedly attached to the pair of support members and adapted to be retained within a slot in the front surface of most commercially available 13" TV monitors. A pair of J-hook rods are connected between the fixed U-shaped frame member and the U-shaped bail member to improve the rigidity of the assembly.

DETAILED DESCRIPTION OF THE INVENTION

Figure 1:
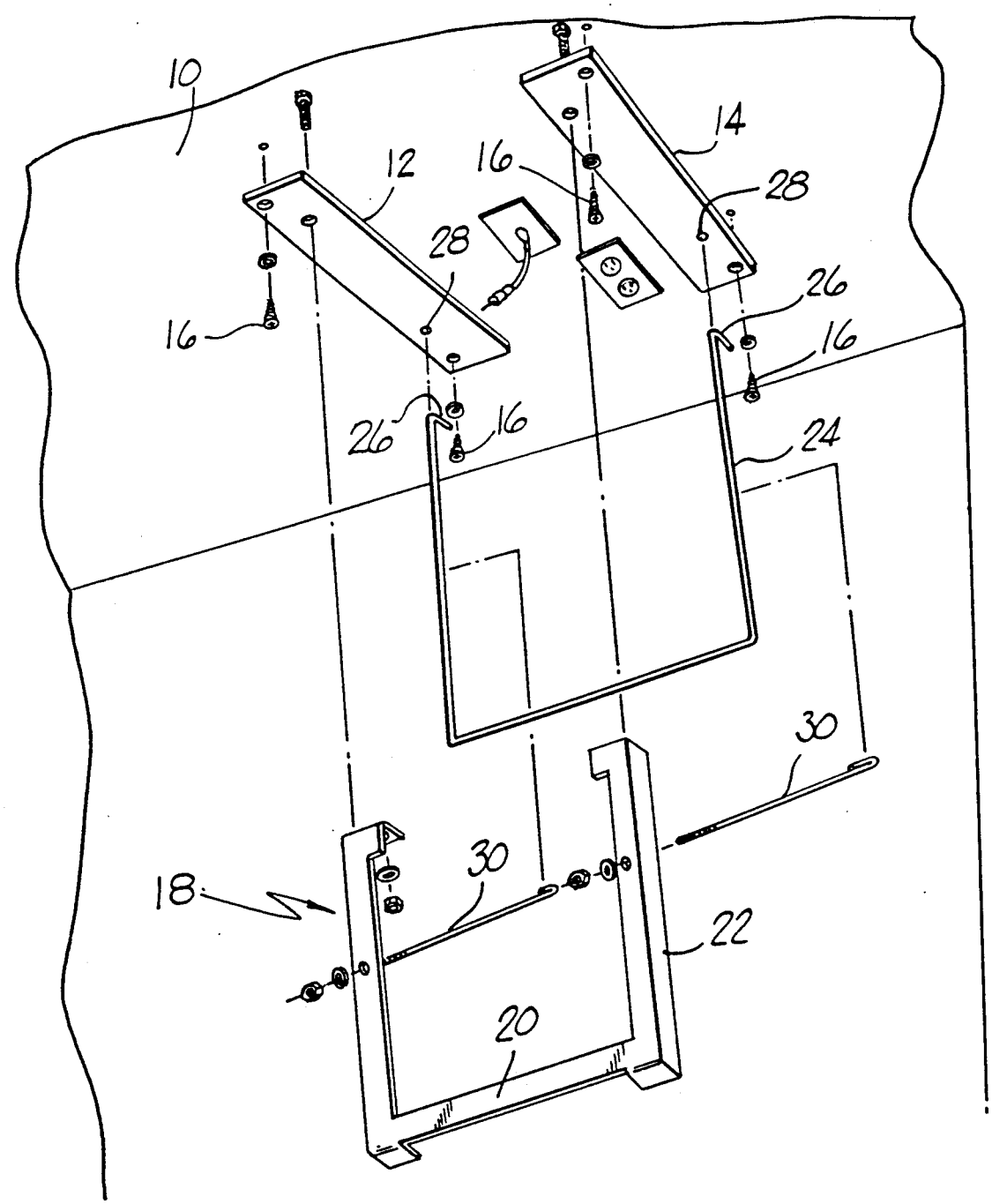
FIG. 1 is an exploded pictorial diagram of a ceiling mount assembly for a TV monitor in accordance with the present invention.
Figure 2:
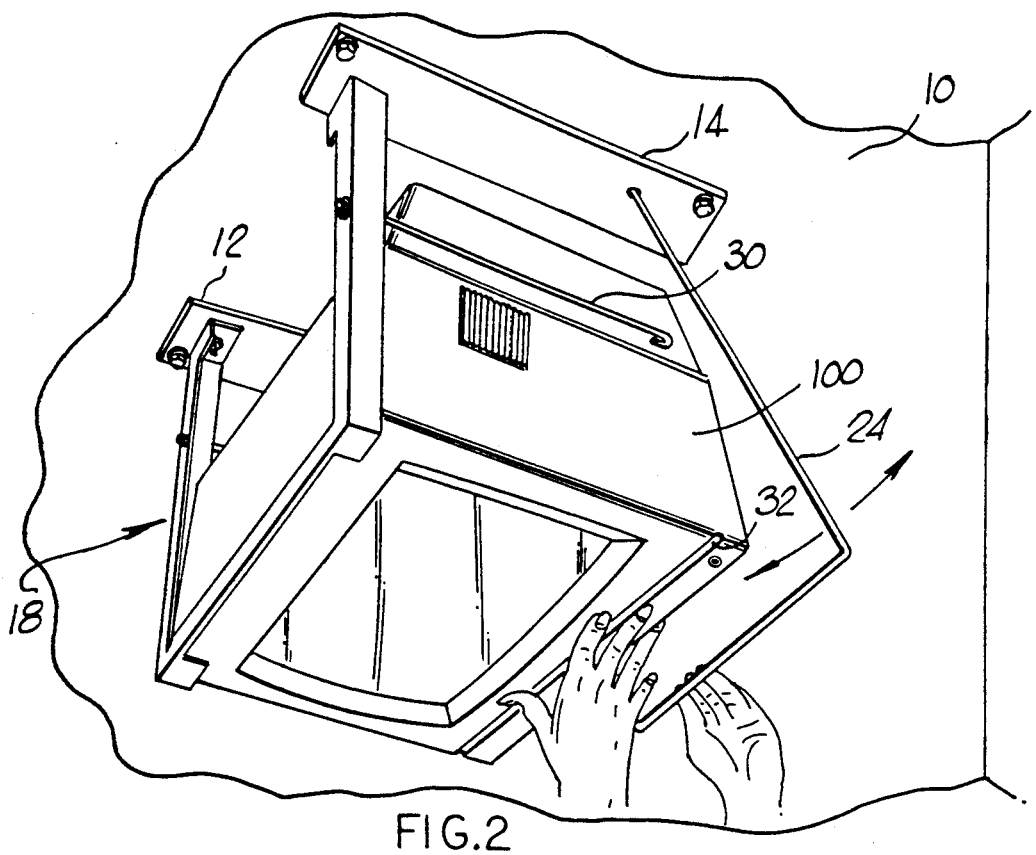
FIG. 2 is a pictorial diagram of the ceiling mount assembly of FIG. 1 illustrating the way in which a TV monitor is initially positioned for installation in the ceiling mount.
Figure 3:
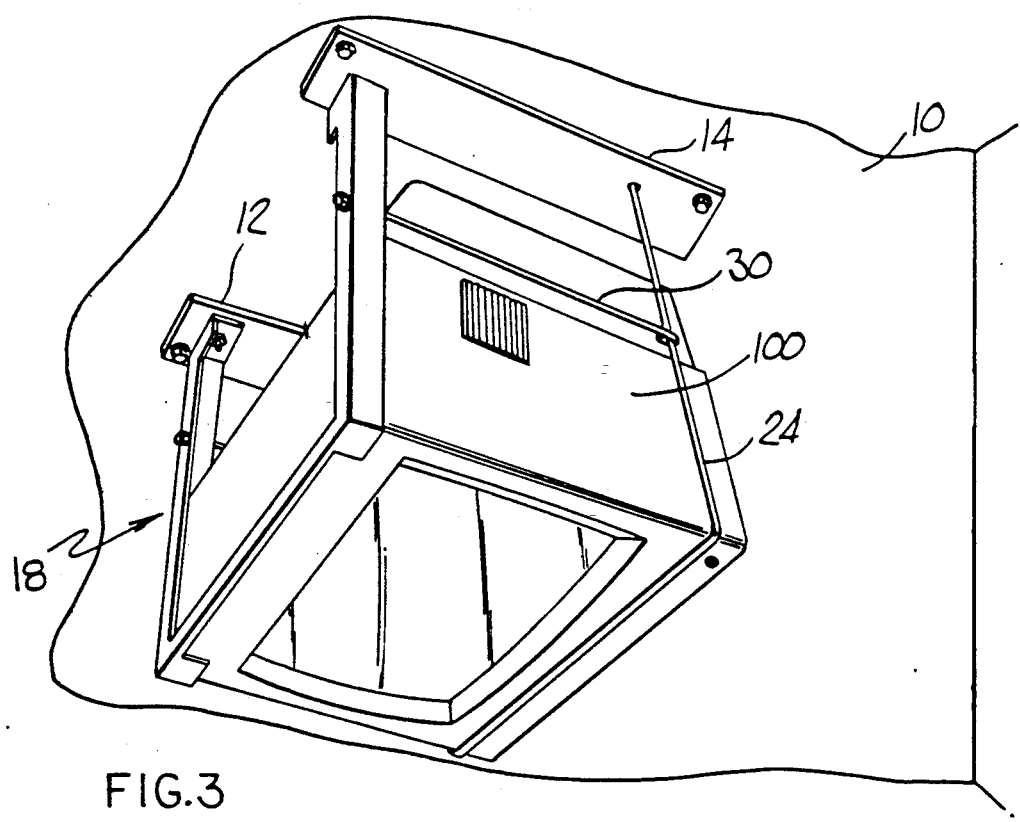
FIG. 3 is a pictorial diagram of the ceiling mount assembly of FIGS. 1 and 2 illustrating the final position of a TV monitor when installation has been completed.

Referring now primarily to the exploded pictorial diagram of FIG. 1, there are shown a pair of support members 12 and 14 that are attached to a ceiling 10 in an area in which it is desired to locate a TV monitor for easy viewing from below by a person in a supine position, for example. Support members 12 and 14 are typically anchored to adjacent parallel ceiling joists (not illustrated) that are located above ceiling 10. A number of lag bolts 16 may be employed for this purpose. A U-shaped frame member 18 is bolted to support members 12, 14 so as to be in a fixed dependent position. U-shaped frame member 18 includes a front surface 20 and a side surface 22 that are formed at right angles to each other for cradling a TV monitor, as illustrated in FIGS. 2 and 3. As further illustrated in FIGS. 2 and 3, the length of and horizontal spacing between the vertical legs of U-shaped frame member 18 are determined in accordance with the dimensions of the TV monitor to be mounted. Referring again to FIG. 1, a U-shaped bail member 24 is connected in dependent hinged relationship to support members 12, 14 by means of right-angle hooks 26 that are formed at the upper ends of U-shaped bail member 24 and that are received by corresponding holes 28 in support members 12, 14. A slot (not illustrated) is provided in the upward facing surface of each of support members 12, 14 adjacent holes 28 within which hooks 26 reside. A pair of J-hook rods 30, threaded at one end and having a J-hook formed at the other end, are provided for horizontal attachment between U-shaped frame member 18 and U-shaped bail member 24 when installation of a TV monitor has been completed.

Referring now to FIG. 2, it may be seen how a TV monitor 100 is installed in the ceiling mount assembly of the present invention. TV monitor 100 is first lifted into a position of being cradled at two of its corners by fixed, dependent U-shaped frame member 18, while U-shaped bail member 24 is rotated away from TV monitor 100 to prevent interference therewith. While TV monitor 100 is being held in place by the installer, U-shaped bail member 24 is rotated into a position of alignment with a slot 32 formed across the face of TV monitor 100. Slot 32 is provided, without modification by the purchaser, in nearly all 13" TV monitors that are commonly available. When the installer releases his support, TV monitor 100 is cradled by U-shaped frame member 18 and U-shaped bail member 24, as illustrated in FIG. 3. Finally, J-hook rods 30 are hooked over U-shaped bail member 24 and bolted to U-shaped frame member 18, as also illustrated in FIG. 3.

Television monitor 100 may be readily removed from the ceiling mount assembly of the present invention by simply reversing the installation procedure described above. J-hook rods 30 are first unbolted from U-shaped frame member 18 at one end and unhooked from U-shaped bail member 24 at the other end. Monitor 100 may then be simply lifted at its edge adjacent U-shaped bail member 28 to release U-shaped bail member 28 from slot 32. U-shaped bail member 28 is then rotated away from monitor 100 to the approximate position illustrated in FIG. 2, and monitor 100 is then simply lowered out of cradling engagement with U-shaped frame member 18.

I claim:

1. A ceiling mount assembly for suspending a television monitor in a fixed position from a ceiling such that the screen of the television monitor is horizontal for viewing by a person in a supine position beneath the television monitor, the television monitor being of the type having a recessed slot across a front surface thereof proximate one edge of the television monitor, the ceiling mount assembly comprising:

support means anchored to the ceiling;

U-shaped frame means mounted to said support means in a fixed dependent position, said U-shaped frame means having a right angle cross section for cradling said television monitor along an edge thereof that is away from said recessed slot;

U-shaped bail means hingedly connected to said support means in a dependent position spaced apart from said U-shaped frame means, said U-shaped bail means being positioned in alignment with said recessed slot for engagement therewith; and a pair of J-hook rods adapted for connection in a horizontal position between said U-shaped frame means and said U-shaped bail means.

2. A ceiling mount assembly as in claim 1 wherein said support means comprises a pair of support members anchored to one or more ceiling joists.

3. A ceiling mount assembly as in claim 1 wherein said U-shaped bail means comprises a formed metal rod.

* * * * *